United States Patent
Kim

(10) Patent No.: US 8,037,282 B2
(45) Date of Patent: Oct. 11, 2011

(54) REGISTER HAVING SECURITY FUNCTION AND COMPUTER SYSTEM INCLUDING THE SAME

(75) Inventor: Moon-gyung Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 606 days.

(21) Appl. No.: 12/170,652

(22) Filed: Jul. 10, 2008

(65) Prior Publication Data

US 2009/0019214 A1 Jan. 15, 2009

(30) Foreign Application Priority Data

Jul. 13, 2007 (KR) .................. 10-2007-0070777

(51) Int. Cl.
*G06F 12/00* (2006.01)

(52) U.S. Cl. .. 711/215; 711/109; 711/110; 711/E12.091

(58) Field of Classification Search .................. None
See application file for complete search history.

(56) References Cited

U.S. PATENT DOCUMENTS 5,721,872 A * 2/1998 Katsuta ........................ 711/163
6,470,439 B2 * 10/2002 Yamada et al. ............... 711/215

FOREIGN PATENT DOCUMENTS

| JP | 2004-280623 | 10/2004 |
|---|---|---|
| KR | 94-2862 | 2/1994 |
| KR | 98-4741 | 3/1998 |

* cited by examiner

*Primary Examiner* — Reginald Bragdon
*Assistant Examiner* — Thanh Vo
(74) *Attorney, Agent, or Firm* — F. Chau & Associates, LLC

(57) ABSTRACT

A register having a security function is provided. The register includes: a write security unit and a storage unit. The write security unit outputs a first control signal to control whether a write operation is permissible, in response to a write signal, an address signal, and a write permission signal. The storage unit writes and stores input data, in response to the first control signal. The write permission signal is received from an external source and indicates whether to protect the written data.

21 Claims, 7 Drawing Sheets

PROTECTION REGISTERS

REGISTER HAVING SECURITY FUNCTION AND COMPUTER SYSTEM INCLUDING THE SAME

CROSS-REFERENCE TO RELATED PATENT APPLICATION

This application claims priority to Korean Patent Application No. 10-2007-0070777, filed on Jul. 13, 2007, in the Korean Intellectual Property Office, the disclosure of which is incorporated by reference in its entirety herein.

BACKGROUND OF THE INVENTION

1. Technical Field

The present disclosure relates to a register, and more particularly, to a register which protects data and maintains security, and to a computer system including the register.

2. Discussion of Related Art

With advances in density and reliability of memory, storage device users have gained confidence in storing personal and vital data in them. Data security prevents stored data from being accessed by unauthorized parties. Data protection protects stored data that needs to be maintained from being deleted.

Conventional memory storage devices do not always restrict data reading and protect written data. For example, a separate protection circuit may be included in a conventional memory device to protect previously stored data. However, the stored data can then be arbitrarily accessed. Further, the addition of a separate protection circuit increases the entire area of the memory storage device.

Thus, there is a need for a register which maintains security and protection of data without including a separate protection circuit.

SUMMARY OF THE INVENTION

According to an exemplary embodiment of the present invention, there is provided a register having a security function. The register includes: a write security unit and a storage unit. The write security unit outputs a first control signal to control whether a write operation is permissible, in response to a write signal, an address signal, and a write permission signal. The storage unit writes and stores input data, in response to the first control signal. The write permission signal is applied from an external source and indicates whether to protect the written data.

The register may further include a read security unit which outputs data stored in the storage unit, in response to a read permission signal. The read permission signal is applied from an external source and indicates whether to permit reading out the stored data. The write permission signal may be generated from one of a central processing unit (CPU) or a user of the register.

According to an exemplary embodiment of the present invention, there is provided a computer system. The computer system includes: a central processing unit (CPU), a register array unit, a security controller, a data bus, and a storage unit. The register array unit includes a plurality of registers. The security controller outputs a write permission signal. The write permission signal allows input data to be written to the registers, in response to a request for security received from one of the CPU or an external source. The data bus transmits a signal between the CPU, the register array unit, and the security controller. All or some of the plurality of the registers respectively include a write security unit. The write security unit outputs a first control signal to control whether a write operation is permissible, in response to a write signal, an address signal, and the write permission signal. The storage unit writes and stores the input data, in response to the first control signal. The write permission signal indicates whether to protect the written data.

According to an exemplary embodiment of the present invention, there is provided a computer system. The computer system includes a central processing unit (CPU), a register array block, a data bus, and a storage unit. The register array block includes a plurality of registers and a security signal generator. The data bus transmits a signal between the CPU and the register array block. The security signal generator outputs a write permission signal which allows input data to be written to the registers, in response to a request for security received from one of the CPU or an external source. All or some of the plurality of the registers respectively include a write security unit which outputs a first control signal controlling whether a write operation is permissible, in response to a write signal, an address signal, and the write permission signal. The storage unit writes and stores the input data, in response to the first control signal. The write permission signal indicates whether to protect the written data.

BRIEF DESCRIPTION OF THE DRAWINGS

The present invention will become more apparent by describing in detail exemplary embodiments thereof with reference to the attached drawings in which.

DETAILED DESCRIPTION OF EXEMPLARY EMBODIMENTS

Figure 1:
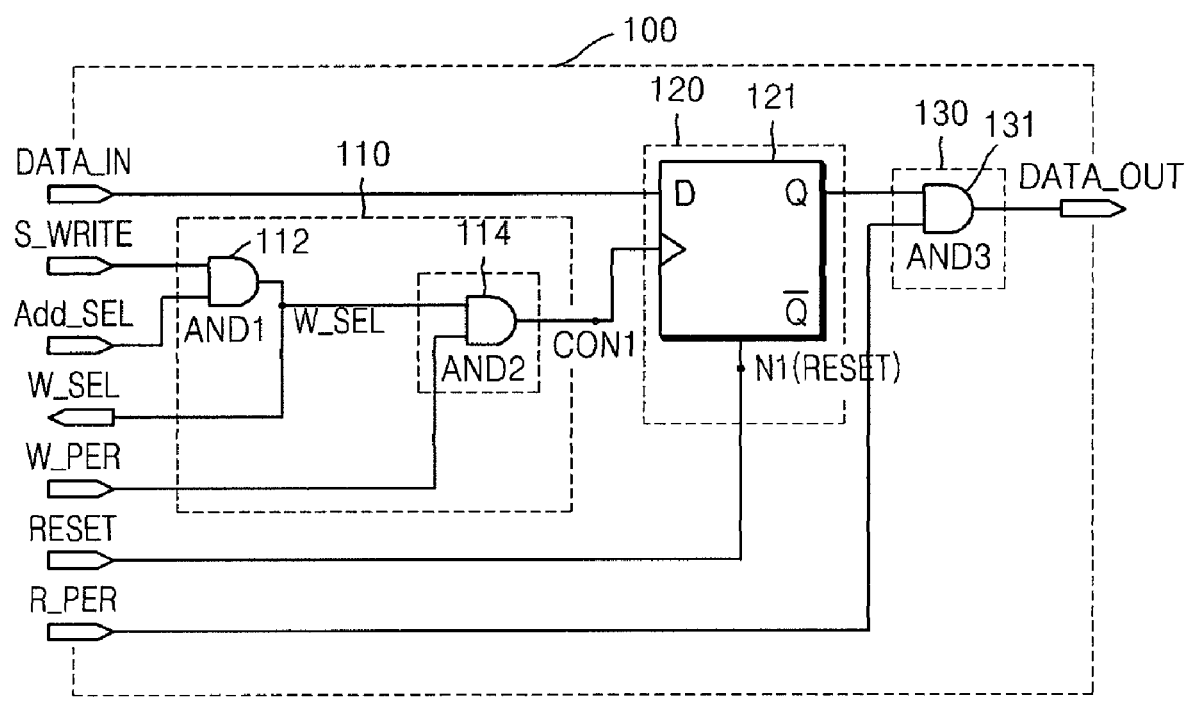
FIG. 1 is a diagram of a register according to an exemplary embodiment of the present invention.

Hereinafter, the present invention will be described in detail by explaining exemplary embodiments of the invention with reference to the attached drawings. Like reference numerals in the drawings denote like elements.

A register according to at least one exemplary embodiment of the present invention receives signals having security information generated from a central processing unit (CPU) or an external source during a write operation or a read operation of data. In response to the received signals, the register automatically determines whether to perform a normal operation or to ignore a request for a write operation or a read operation. For automatic determination, simple logic elements such as an AND gate or an OR gate may be included in the register. Accordingly, the register having a security function may be realized without inserting a separate (e.g., a wide scope) protection circuit into the register.

FIG. 1 is a diagram of a register according to an exemplary embodiment of the present invention. Referring to FIG. 1, the register 100 includes a write security unit 110 and a storage unit 120. The register 100 may further include a read security unit 130.

The write security unit 110 receives a write signal S_WRITE, an address signal Add_SEL, and a write permission signal W_PER. In response to these signals, the write security unit 110 outputs a first control signal CON1.

In response to the first control signal CON1, the storage unit 120 determines whether to store input data DATA_IN. The storage unit 120 receives a reset signal RESET in an initial stage and is reset. The reset signal RESET is applied once in an initial stage at an activation level.

The write signal S_WRITE requests storing of the data DATA_IN transmitted through a data input terminal to the storage unit 120.

When an address signal is generated for the corresponding storage unit 120 to be selected, the address signal Add_SEL is transmitted at the activation level and indicates that the corresponding storage unit 120 is selected.

The write permission signal W_PER is applied externally and indicates whether data previously stored in the storage unit 120 should be protected or newly transmitted data should be written to the storage unit 120. When the write permission signal W_PER is output at the activation level, in response to this, the storage unit 120 writes and stores new data. Hereinafter, an example illustrating a logic high as the activation level of the write permission signal W_PER is described.

The write permission signal W_PER is generated external to the register. For example, the write permission signal W_PER may be generated by a central processing unit (CPU) or a device (or a signal) from a user.

The first control signal CON1 is transmitted to the storage unit 120 and is used as a signal for controlling a write operation of the storage unit 120. When the write permission signal W_PER is input at the activation level and when both the write signal S_WRITE and the address signal Add_SEL are input at the activation level, the first control signal CON1 controls the storage unit 120 to store the transmitted data DATA_IN.

The read security unit 130 receives an output signal from the storage unit 120 and a read permission signal R_PER. In response to the read permission signal R_PER, the read security unit 130 determines whether the output signal of the storage unit 120 should be output. The output signal of the storage unit 120 may be output when the read permission signal R_PER is input at the activation level.

The read permission signal R_PER is applied from an external source and has information on whether reading out data stored in the storage unit 120 should be permitted. For example, the read permission signal R_PER may be generated by a central processing unit (CPU) or a device (or a signal) from a user. When the read permission signal R_PER is applied at the activation level, data stored in the storage unit 120 may be read or output from the register 100. Hereinafter, an example illustrating the activation level of the read permission signal R_PER as a logic high is described.

The write security unit 110 includes two AND gates 112 and 114. The first AND gate 112 receives the write signal S_WRITE and the address signal Add_SEL and logically sums these signals, thereby outputting the summed signal as a write selection signal W_SEL. The second AND gate 114 receives the write selection signal W_SEL and the write permission signal W_PER and logically sums these signals, thereby outputting the summed signal as the first control signal CON1.

The storage unit 120 may be any storage device. In FIG. 1, the register includes a flip-flop 121. The storage unit 120 receives the first control signal CON1 at a clock input terminal and receives input data DATA_IN transmitted at a data input terminal. When the first control signal CON1 is output at the activation level, data DATA_IN is synchronized with the first control signal CON1 and transmitted for output to a data output terminal (e.g., a Q terminal).

The read security unit 130 includes an AND gate 131. The AND gate 131 receives the output signal of the storage unit 120 and the read permission signal R_PER and logically sums these signals, thereby outputting the summed signal as a data output signal DATA_OUT.

Figure 2:
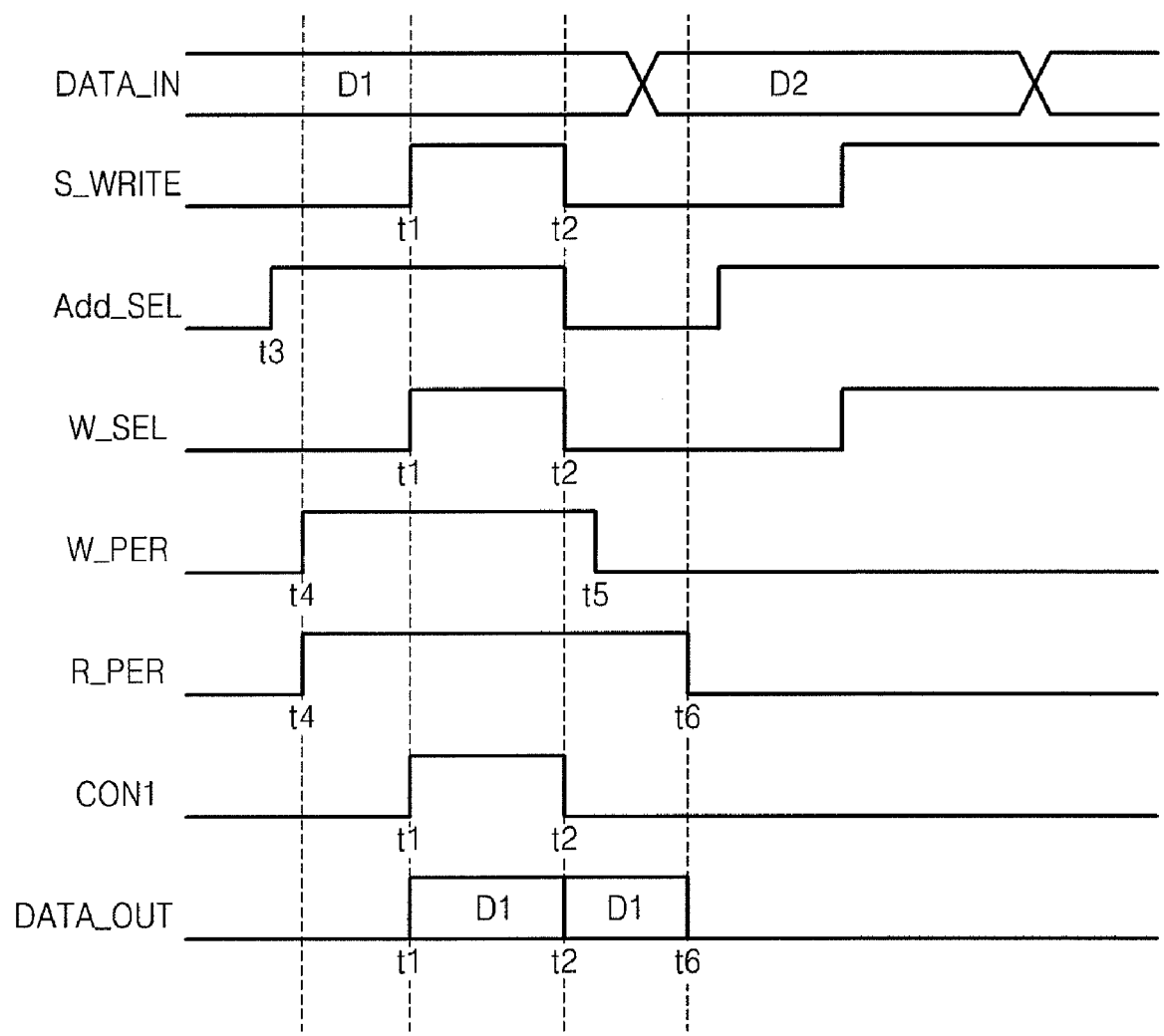
FIG. 2 is a diagram illustrating waveforms of signals input to and output from the register illustrated in FIG. 1.

FIG. 2 is a diagram illustrating waveforms of signals input to and output from the register illustrated in FIG. 1. A security operation of FIG. 1 is described with reference to FIG. 2. Referring to FIG. 2, the address signal Add_SEL is applied at a logic high level at time t3. The write signal S_WRITE is applied at a logic high level at time t1.

The first AND gate 112 logically sums these signals and outputs the write selection signal W_SEL at a logic high level at time t1. When the write permission signal W_PER is applied at a logic high level from time t4, the first control signal CON1 is output at a logic high level from time t1 when the write selection signal W_SEL reaches a logic high level.

The flip-flop 121 is synchronized with a clock signal to be operated and the flip-flop 121 begins storing and outputting the transmitted data DATA-IN when a signal level applied to a clock terminal transitions from a logic low level to a logic high level. Accordingly, when the first control signal CON1 input to the clock terminal reaches a logic high level, the flip-flop 121 stores and outputs the data DATA_IN transmitted to the input terminal. Data D1 is stored and output from time t1.

After time t5, when the write permission signal W_PER reaches a logic low level, the write permission signal W_PER has a logic value of 0 and thus, the first control signal CON1 is output at a logic low level. Thus, a logic low signal may be continuously applied to the clock terminal of the flip-flop 121 and the flip-flop 121 does not perform a write operation. Newly transmitted data D2 cannot be written and previously stored data D1 is maintained.

During a time between times t4 and t6, when the read permission signal R_PER has a logic high value, a logic value of 1 is input to one input terminal of the third AND gate 131, thereby enabling stored data (e.g., a Q terminal signal of the flip-flop 121) to be read externally from the register 100.

During a time after time t6 when the read permission signal R_PER has a logic low value, a 0 is input to one input terminal of the third AND gate 131, thereby causing the AND gate to output a 0. When the stored data is not permitted to be read outside of the register by the read permission signal R_PER, a signal set to a 0 is output.

When the write signal S_WRITE is input, and the write permission signal W_PER or the read permission signal R_PER are received at the activation level, writing and storing of data or reading of the stored data are allowed. When the read permission signal is not transmitted during a reading operation, the value of '0' is output, instead of the stored value.

A register according to an exemplary embodiment of the present invention includes three simple logic elements (for example, AND gates), which enable security of writing and reading operations to be automatically maintained.

Moreover, since a clock signal is not used in the internally used flip-flop (for example, the flip-flop 121 in FIG. 1), power consumption can be minimized because it is not necessary to generate and continuously operate a clock signal. Further, a register according to an exemplary embodiment of the present invention can be applied to a non-synchronous memory structure or a semiconductor device.

Figure 3A:
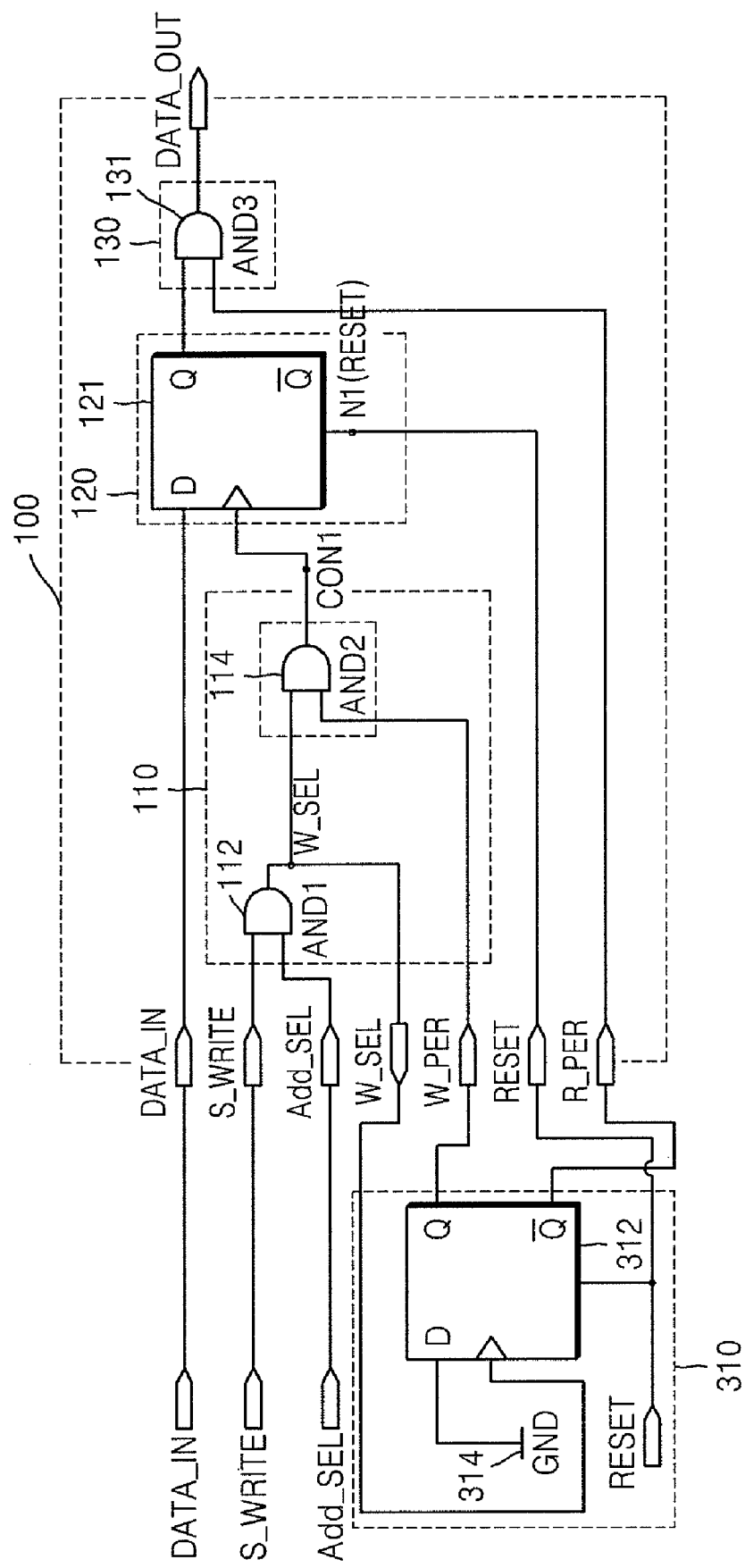
FIG. 3A is a diagram illustrating another example of the register illustrated in FIG. 1, according to an exemplary embodiment of the present invention.

FIG. 3A is a diagram illustrating another example of the register illustrated in FIG. 1. Referring to FIG. 3A, the register 100 of FIG. 1 further includes a once write controller 310. The once write controller 310 allows a write operation in the register 100 only once and is used when the stored data is to be protected permanently. The once write controller 310 includes a flip-flop 312.

The flip-flop 312 is connected to a power source voltage GND 314 having a low data input terminal D and receives the write selection signal W_SEL at a clock input terminal. The output terminal Q generates a once write control signal as the write permission signal W_PER and an inverse output terminal /Q generates the read permission signal R_PER.

When both the write signal S_WRITE and the address signal Add_SEL reach a logic high level, thereby causing the write selection signal W_SEL to also reach a logic high level, a logic high signal is input to the clock input terminal of the flip-flop 312 and the flip-flop 312 performs write and storing operations. Accordingly, a logic low signal (e.g., a signal having a low voltage) applied to the data input terminal is written and stored. Thus, a logic low signal is output from the output terminal Q of the flip-flop 312.

Since the write permission signal W_PER is at a logic low level, the control signal CON1 is output at a logic low level and the flip-flop 121 of the storage unit 120 does not perform write and storing operations. Accordingly, data firstly stored is maintained in the flip-flop 121 of the storage unit 120. Since the read permission signal R_PER reaches a logic high level, data previously stored in the storage unit 120 can be read.

Figure 3B:
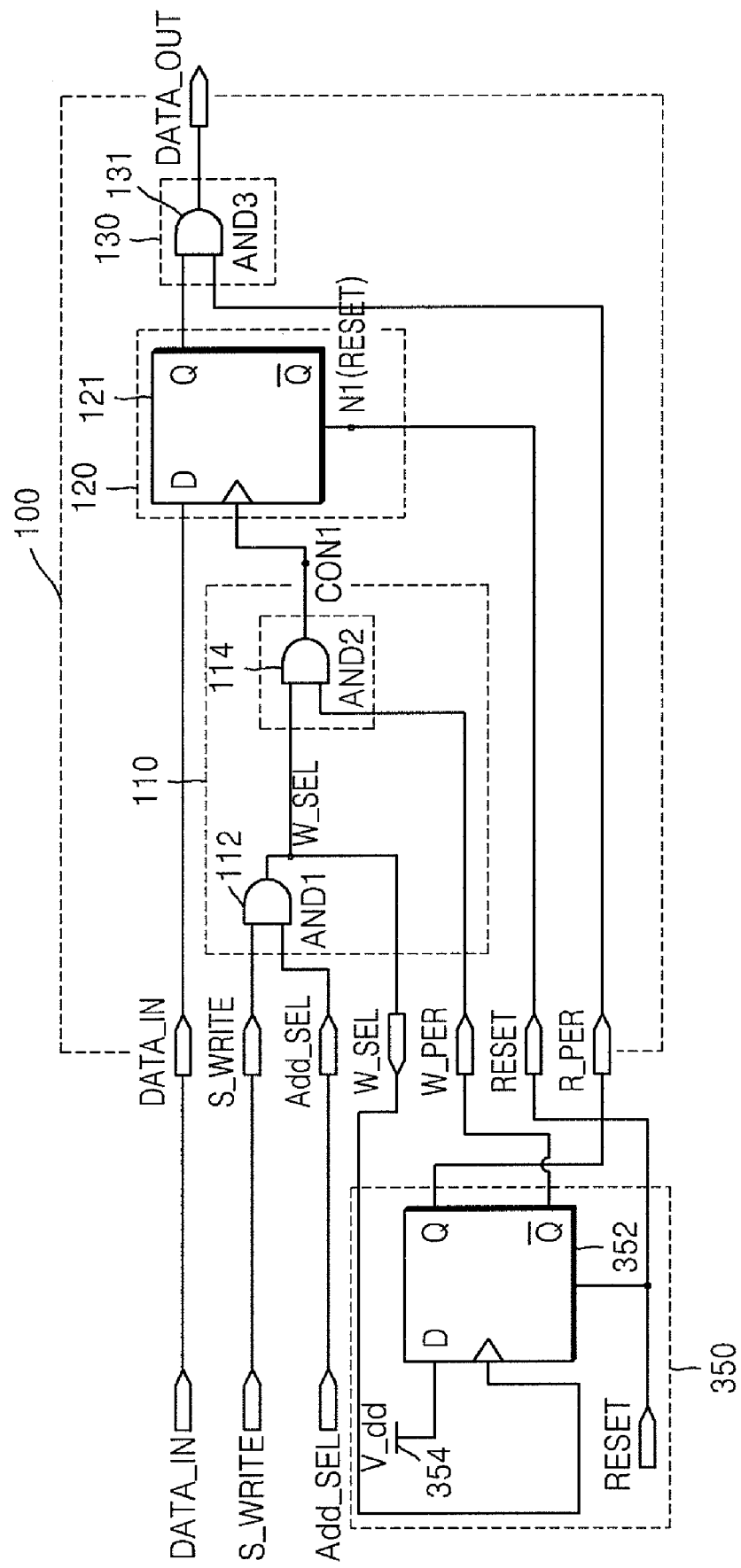
FIG. 3B is a diagram illustrating a modified example of the register illustrated in FIG. 3A.

FIG. 3B is a diagram illustrating a modified example of the register illustrated in FIG. 3A. Referring to FIG. 3B, the connection of input and output terminals in a flip-flop 352 is different from that of FIG. 3A.

The data input terminal D of the flip-flop 352 regularly receives a high power source voltage V_dd and also receives the write selection signal W_SEL at the clock input terminal. The output terminal Q receives the read permission signal R_PER and the inverse output terminal /Q receives the write permission signal W_PER.

Since the operations and the operation results of the flip-flop 352 are the same as those of the flip-flop 312 of FIG. 3A, a detailed description thereof is not needed.

Figure 4:
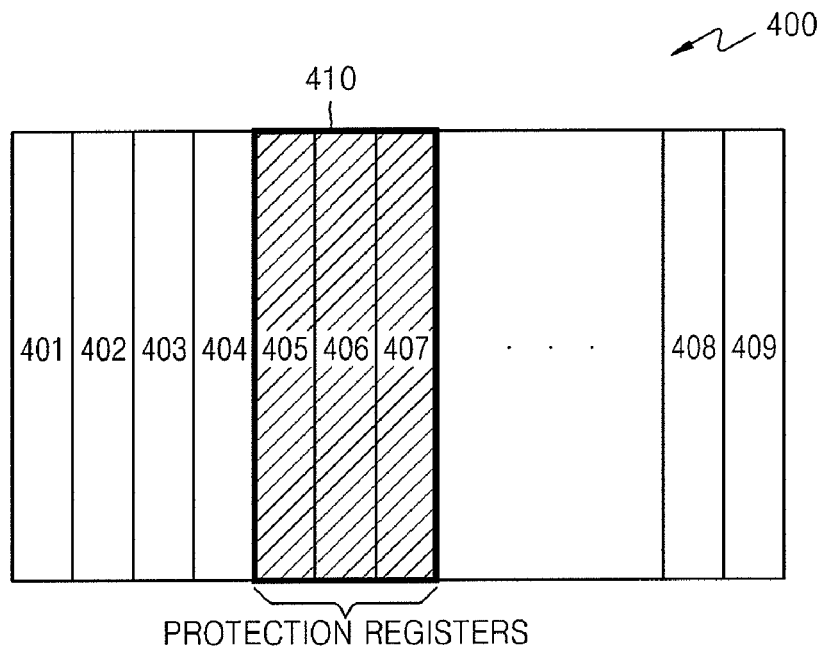
FIG. 4 is a diagram illustrating a register array including the register of FIG. 1.

FIG. 4 is a diagram illustrating a register array including the register of FIG. 1.

Referring to FIG. 4, the register array 400 includes a plurality of the registers 401 through 409.

In the register array 400, some of the registers, for example registers 405, 406, and 407, may be the same as the register 100 in FIG. 1. Thus, the register array 400 may maintain security at a bit unit. Security of the register array 400 can be maintained even though not all of the security registers in register array 400 use registers like those described in FIGS. 1 through 3B. In another embodiment of the present invention, all the registers of the register array 400 are the same as the register 100 of FIG. 1.

Figure 5A:
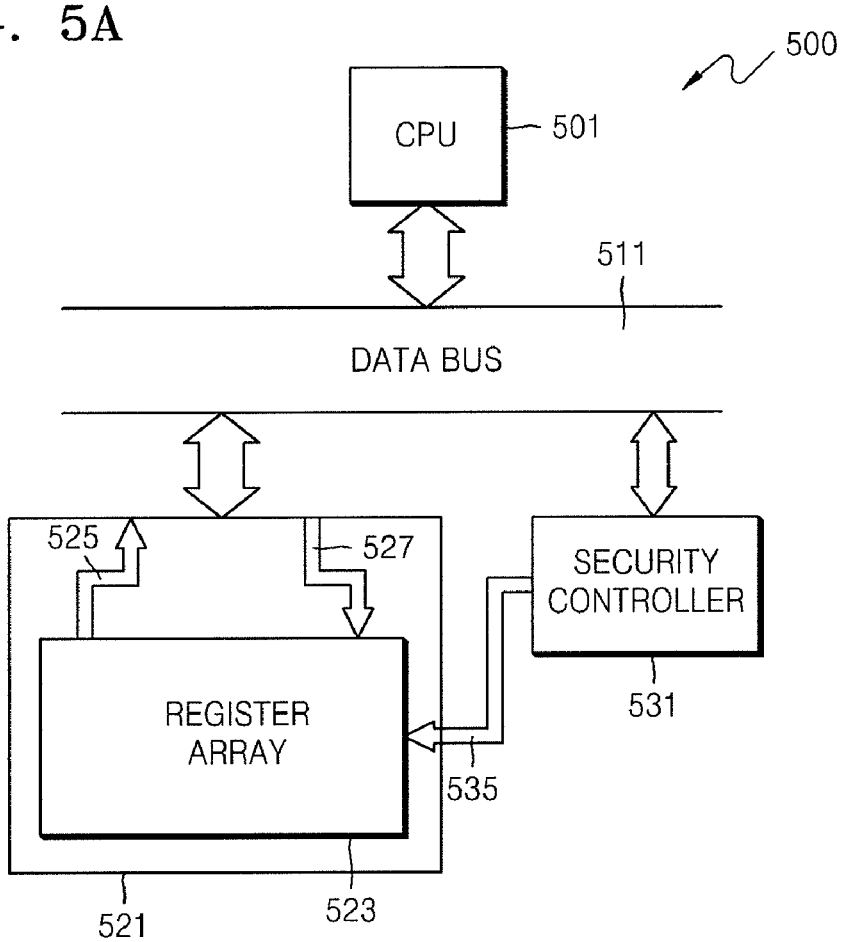
FIG. 5A is a diagram of a computer system according to an exemplary embodiment of the present invention.

FIG. 5A is a diagram of a computer system according to exemplary embodiment of the present invention. Referring to FIG. 5A, the computer system 500 includes a central processing unit (CPU) 501, a data bus 511, a security controller 531, and a register array unit 521. The CPU 501 is a general CPU, which controls all operations of the computer system 500 such as executing instructions, including write and read operations.

The register array unit 521 includes a register array 523 and signal connection lines 525 and 527. The signal connection lines 525 and 527 may not be included in the register array unit 521, and the data bus 511 may be directly connected to the register array 523. The signal connection line 527 may be a data bus through which input data DATA_IN is transmitted and the signal connection line 525 may be a data bus through which output data DATA_OUT is transmitted.

The register array 523 includes a plurality of registers. All or some of the registers included in the register array 523 may be registers according to the embodiments illustrated in FIG. 1, 3A, or 3B. Accordingly, a detailed description of the registers included in the register array 523 is not needed.

The security controller 531 outputs the write permission signal W_PER in response to a request for security applied from the CPU 501 or external to the computer system. The write permission signal W_PER controls whether input data DATA_IN is to be stored in one register of the register array 523 and is the same as described with reference to FIGS. 1 and 2.

In this setting, the "request for security" denotes that data stored in the register is not deleted and is instead continuously maintained. Such a request is not to delete previously stored data, if newly transmitted data is written. Thus, the write permission signal W_PER has indicates whether data written to the register should be protected.

The security controller 531 may further generate the read permission signal R_PER, in response to a request for security applied from the CPU 501 or an external source.

In this setting, the "request for security" denotes a request for permitting or preventing reading out or leaking of data stored in the register. Thus, the read permission signal P_PER indicates whether data stored in the register should be read out.

The register array 523 responds to the write permission signal W_PER or the read permission signal R_PER output from the security controller 531 and performs a security operation.

The data bus 511 is a signal transmission path capable of transmitting a signal between each of the elements in the computer system 500.

Figure 5B:
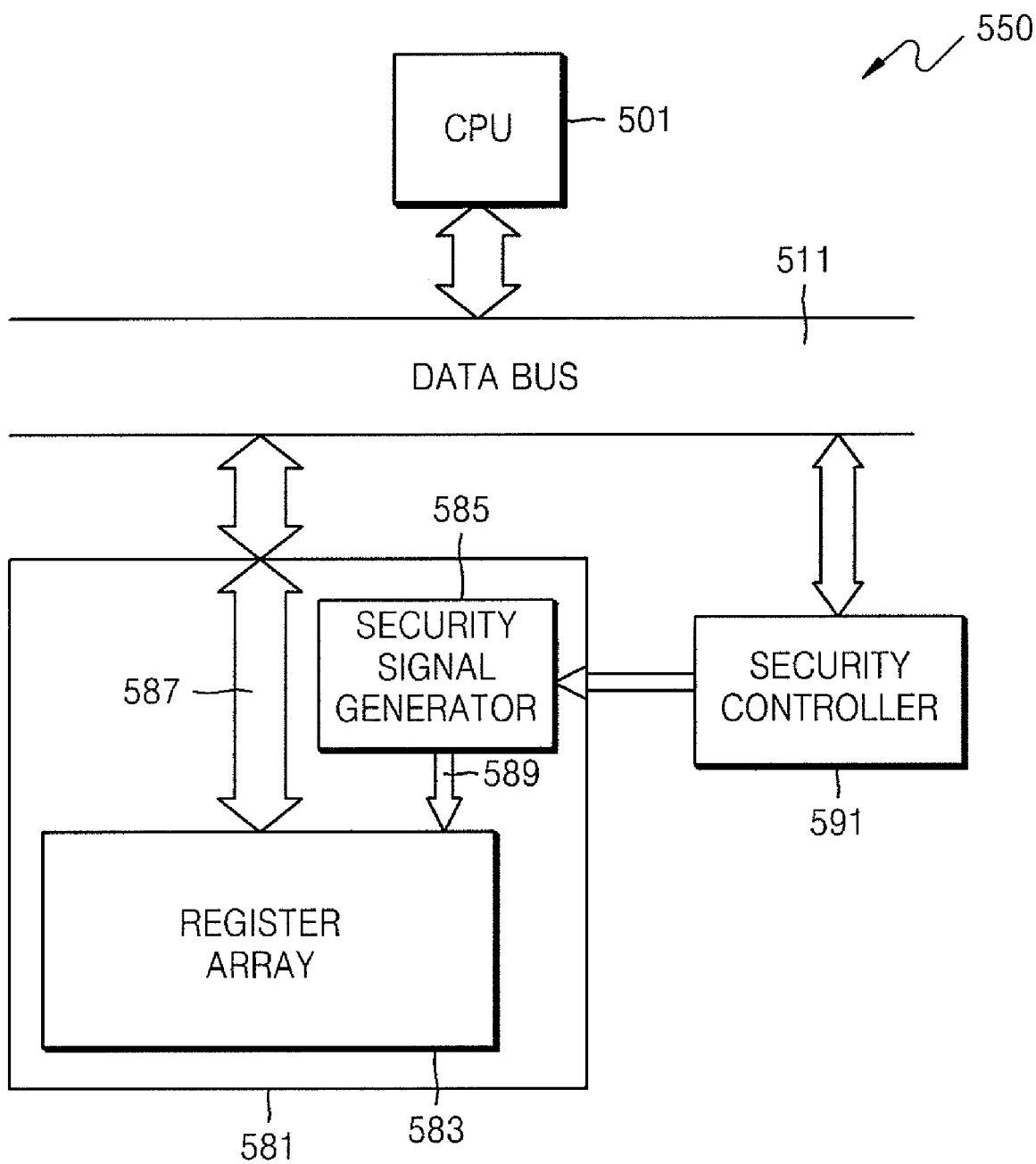
FIG. 5B is a diagram illustrating another example of the computer system illustrated in FIG. 5A, according to an exemplary embodiment of the present invention.

FIG. 5B is a diagram illustrating another example of the computer system illustrated in FIG. 5A. Referring to FIG. 5B, the computer system 550 may further include a separate security signal generator 585 in a register array unit 581, as compared with the computer system 500 of FIG. 5A.

A security controller 591 operates in response to a request for security from an external source or the CPU 501 and controls the security signal generator 585 to generate the write permission signal W_PER or the read permission signal R_PER.

The security signal generator 585 responds to the control by the security controller 591 and outputs the write permission signal W_PER or the read permission signal R_PER.

Other elements and operations of the system 550 are the same as those of the computer system 500 illustrated in FIG. 5A, and thus a detailed description thereof is not needed.

Figure 5C:
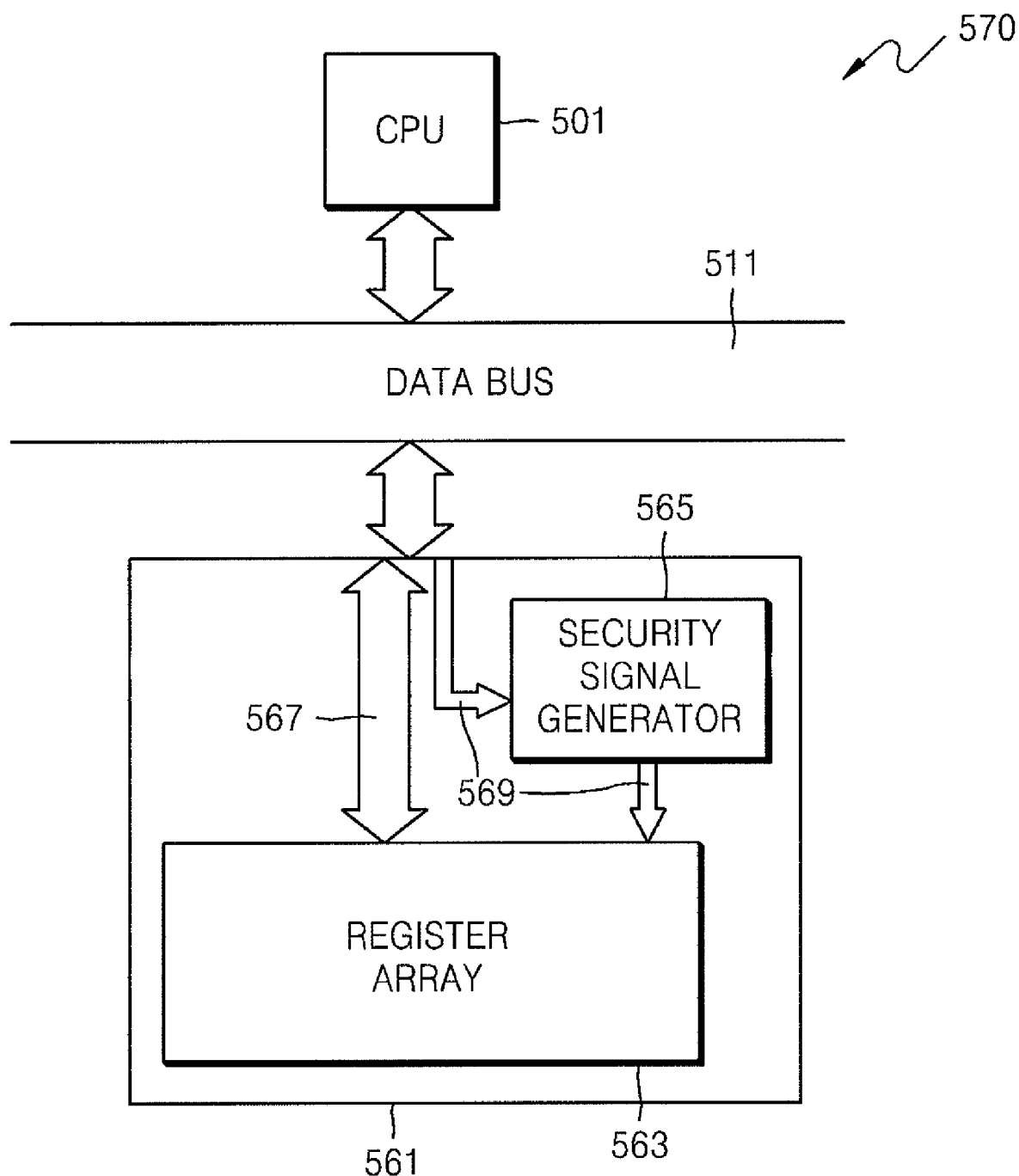
FIG. 5C is a diagram illustrating another example of the computer system illustrated in FIG. 5A, according to an exemplary embodiment of the present invention.

FIG. 5C is a diagram illustrating another example of the computer system illustrated in FIG. 5A. Referring to FIG. 5C, the computer system 570 does not include the security controller 591 described in FIG. 5B, as compared with the computer system of FIG. 5B.

A security signal generator 565 directly receives a request for security output from an external source or the CPU 501 through the data bus 511. In response to the request, the security signal generator 565 generates and outputs the write permission signal W_PER or the read permission signal R_PER.

Other elements and operations of the system 570 are the same as those of the computer system 550 illustrated in FIG. 5B, and thus a detailed description thereof is not needed.

A register according to at least one embodiment of the present invention includes a security unit operated in response to a write permission signal or a read permission signal, thereby enabling data stored in the register to be protected and prevented from being arbitrarily read. Moreover, a separate active clock is not need to operate the register and thus power consumption can be reduced.

A computer system according to at least one embodiment of the present invention includes a security controller which generates a write permission signal or a read permission signal and a register operated in response to the permission signals, thereby enabling security in writing or reading data to be maintained. Moreover, a separate active clock is not needed to operate the register, and thus power consumption can be reduced.

While the present invention has been particularly shown and described with reference to exemplary embodiments thereof, it will be understood by those of ordinary skill in the art that various changes in form and details may be made therein without departing from the spirit and scope of the present invention.

What is claimed is:

1. A register having a security function, the register comprising:
a write security unit which outputs a first control signal controlling whether a write operation is permissible, in response to a write signal, an address signal, and a write permission signal; and
a storage unit which writes and stores input data, in response to the first control signal,
wherein the write permission signal is applied from an external source and indicates whether to protect the written data, and
wherein the write security unit comprises:
a first AND gate which receives the write signal and the address signal, logically sums the received signals, and outputs a result of the sum as a write selection signal; and
a second AND gate which receives the write selection signal and the write permission signal, logically sums the received signals, and outputs a result of the sum as the first control signal.

2. The register of claim 1, further comprising a read security unit which outputs data stored in the storage unit, in response to a read permission signal, the read permission signal being applied from an external source and indicating whether to permit reading out the stored data.

3. The register of claim 2, wherein the write permission signal and the read permission signal are generated from one of a CPU or a user of the register.

4. The register of claim 2, wherein the read security unit comprises a third AND gate which receives an output signal of the storage unit and the read permission signal and logically sums the received signals, and outputs the summed signal.

5. The register of claim 2,
wherein the storage unit includes a flip-flop which receives the input data at a data input terminal of the flip-flop and the first control signal at a clock input terminal of the flip-flop, and
wherein the read security unit comprises a third AND gate which receives an output signal of the flip-flop and the read permission signal and logically sums the received signals, and outputs the summed signal.

6. The register of claim 1, wherein the write permission signal is generated from one of a central processing unit (CPU) or a user of the register.

7. The register of claim 1, wherein the storage unit comprises a flip-flop and the flip-flop receives the input data at a data input terminal of the flip-flop and the first control signal at a clock input terminal of the flip-flop.

8. The register of claim 1, further comprising a once write controller which outputs a once write control signal in a non-activation state, in response to the write selection signal output in an activation level, when both the write signal and the address signal are applied at an activation level, wherein the once write control signal is transmitted as the write permission signal.

9. The register of claim 8,
wherein the once write controller further outputs an inverse signal of the once write control signal, wherein the inverse signal of the once write control signal is transmitted as the read permission signal.

10. The register of claim 9, wherein the once write controller includes a flip-flop, the flip-flop receiving a low power source voltage at a data input terminal of the flip-flop and a write selection signal at a clock input terminal of the flip-flop, wherein a data output terminal of the flip-flop outputs the write permission signal and an inverse data of the flip-flop outputs the read permission signal.

11. The register of claim 9, wherein the once write controller includes a flip-flop, the flip-flop receiving a high power source voltage at a data input terminal of the flip-flop and the write selection signal at a clock input terminal of the flip-flop, wherein a data output terminal of the flip-flop outputs the write permission signal and an inverse data output terminal of the flip-flop outputs the read permission signal.

12. The register of claim 8, wherein the once write controller includes a flip-flop, the flip-flop receiving a low power source voltage at a data input terminal of the flip-flop and a write selection signal at a clock input terminal of the flip-flop, wherein a data output terminal of the flip-flop outputs the write permission signal.

13. The register of claim 8, wherein the once write controller includes a flip-flop, the flip-flop receiving a high power source voltage at a data input terminal of the flip-flop and the write selection signal at a clock input terminal of the flip-flop, wherein a data output terminal of the flip-flop outputs the write permission signal.

14. A computer system comprising:
a central processing unit (CPU);
a register array unit comprising a plurality of registers;
a security controller which outputs a write permission signal, the write permission signal allowing input data to be written to the registers, in response to a request for security received from one of the CPU or an external source; and
a data bus transmitting a signal between the CPU, the register array unit, and the security controller,
wherein all or some of the plurality of the registers respectively comprise a write security unit which outputs a first control signal controlling whether a write operation is permissible, in response to a write signal, an address signal, and the write permission signal; and
a storage unit which writes and stores the input data, in response to the first control signal, and wherein the write permission signal indicates whether to protect the written data, wherein the write security unit comprises:

a first AND gate which receives the write signal and the address signal, logically sums the received signals, and outputs a result of the sum as a write selection signal; and a second AND gate which receives the write selection signal and the write permission signal, logically sums the received signals, and outputs a result of the sum as the first control signal.

15. The computer system of claim 14, wherein the security controller further outputs a read permission signal which allows data stored in the registers to be read, in response to a request for security received from one of the CPU or the external source and wherein all or some of the plurality of the registers further respectively comprise a read security unit which controls output of the stored data, in response to the read permission signal, the read permission signal indicating whether to read out the stored data.

16. The computer system of claim 15, wherein the storage unit includes a flip-flop, the input data being received at a data input terminal of the flip-flop and the first control signal being received at a clock input terminal of the flip-flop.

17. The computer system of claim 15, wherein the read security unit comprises a third AND gate which receives an output signal of the storage unit and the read permission signal and logically sums the received signals, and outputs the summed signal.

18. The computer system of claim 15, wherein all or some of the plurality of the registers further respectively comprise a once write controller which outputs a once write control signal in a non-activation state, in response to the write selection signal output at an activation level, when both the write signal and the address signal are applied in an activation level, the once write control signal as the write permission signal and an inverse signal of the once write control signal being transmitted as the read permission signal.

19. The computer system of claim 14, wherein all or some of the plurality of the registers further respectively comprises a once write controller which outputs a once write control signal in a non-activation state, in response to the write selection signal output at an activation level, when both the write signal and the address signal are applied at an activation level, the once write control signal being output as the write permission signal.

20. A computer system comprising:

a central processing unit (CPU);

a register array block comprising a plurality of registers and a security signal generator;

a data bus transmitting a signal between the CPU and the register array block, wherein the security signal generator outputs a write permission signal which allows input data to be written to the registers, in response to a request for security received from one of the CPU or an external source, wherein all or some of the plurality of the registers respectively comprise a write security unit which outputs a first control signal controlling whether a write operation is permissible, in response to a write signal, an address signal, and the write permission signal; and a storage unit which writes and stores the input data, in response to the first control signal, wherein the write permission signal indicates whether to protect the written data, and wherein the write security unit comprises:

a first AND gate which receives the write signal and the address signal, logically sums the received signals, and outputs a result of the sum as a write selection signal; and a second AND gate which receives the write selection signal and the write permission signal, logically sums the received signals, and outputs a result of the sum as the first control signal.

21. The computer system of claim 20, wherein the security signal generator further outputs a read permission signal which allows data stored in the registers to be read, in response to a request for security received from one of the CPU or the external source, and wherein all or some of the plurality of the registers further comprises a read security unit which controls output of the stored data, in response to the read permission signal, the read permission signal indicating whether to read out the stored data.

* * * * *